Figure 2:
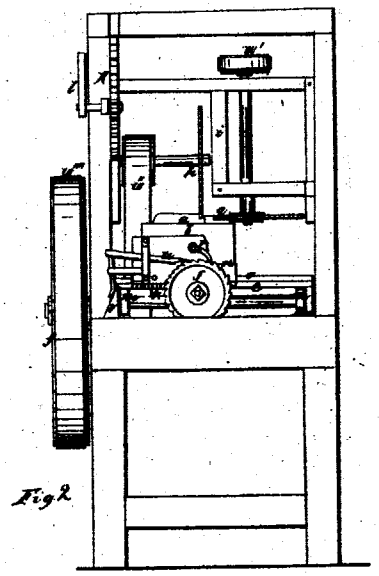
Figure 1:
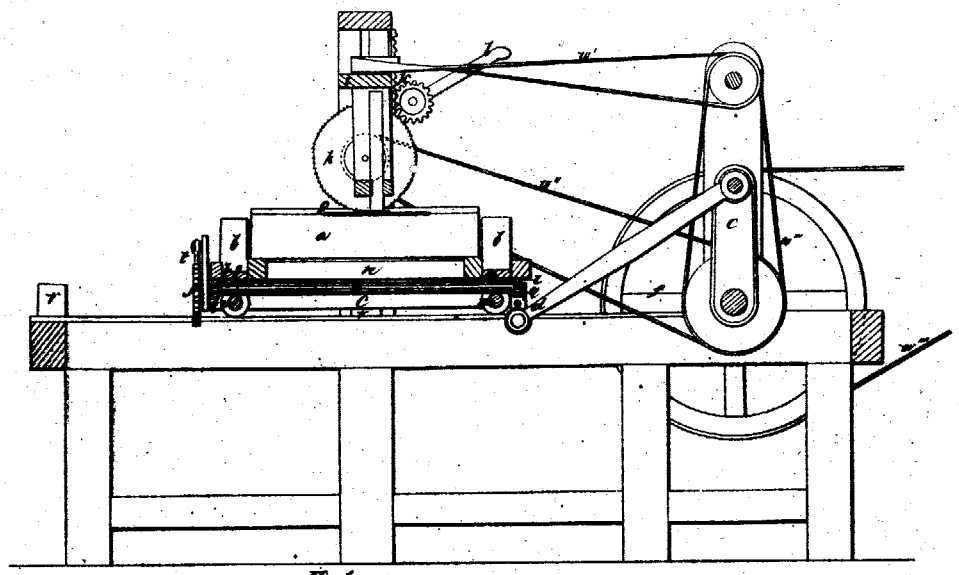

7274X

2 Sheets. Sheet 1

F. Shumard,

Making Laths.

Patented Oct. 31, 1832.

7274X
2 Sheets. Sheet 2.
F. Shumard,
Making Laths.
Patented Oct. 31, 1832.
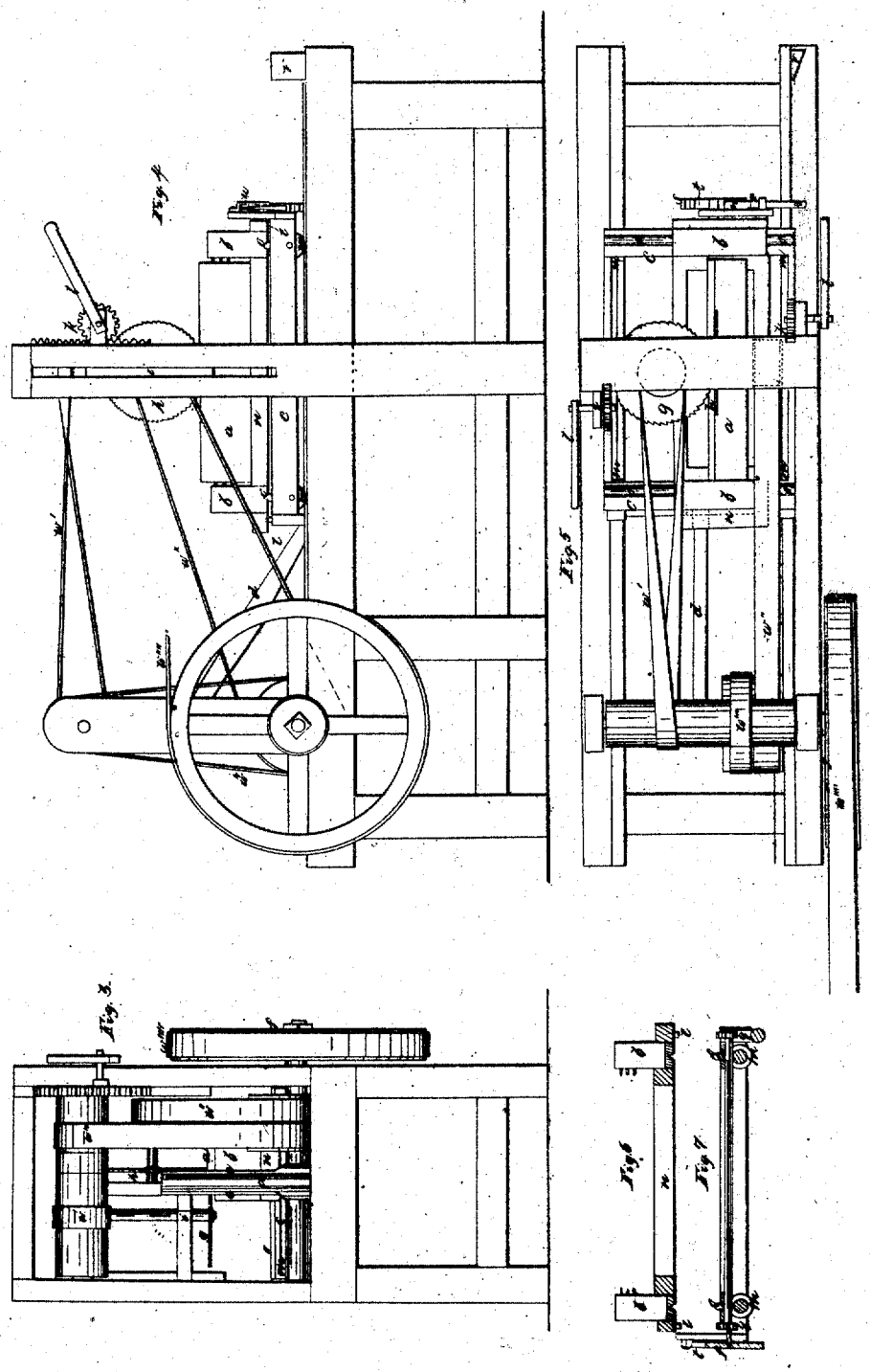

7274X Oct. 31. 1832

Francis Shumard of Cincinnati Ohio

Letters Patent.

The Schedule referred to in these Letters Patent and making part of the same containing a description in the words of the said Francis Shumard him self of his Improvement in the Saw-mill by which Laths are cut with circular Saws —

To all whom it may concern, Be it known that I Francis Shumard of Cincinnati in the County of Hamilton and State of Ohio have invented an improvement in the saw mill, by the application of which circular saws are made to cut laths or other light work on the edge and the side at one operation and that the following is a full and exact description of the said machinery as invented by me. The log to be sawed into Laths or other strips is first cut to the required length, and then fixed upon a saw carriage with suitable head Blocks. This carriage may be made to traverse backward & forward by means of any appropriate gearing. That which I commonly use and which I prefer to any other, is the crank motion communicated from a revolving shaft by means of a pitman. The two shafts of the circular saws run in a frame which is made to slide up and down between vertical chutes above the log by means of a lever a rack and pinion or other contrivance. the frame may be raised or lowered so as to adapt the saws to the dimensions of the log. I usually employ one saw running horizontally and two or more running vertically which latter cut the laths or other strips to a proper thickness, whilst the former cuts them off at their ends.

The saws are made to cut as the log passes in either direction thereby saving the time which would otherwise be expended in drawing the log back. For the purpose of setting or of moving the log sideways the carriage is divided into two parts one of which runs upon suitable rails on the other. An iron shaft under the upper section of the carriage [illegible] on its lower side. I say a [illegible] on the [illegible] of the shaft provided with pall and ratch ... or by a [illegible] hand on the [illegible] any shift the log sideways to such a distance as shall correspond 7274x Oct 31, 1832 with the thickness of the lathe to be cut. At each end of the frame on which the
carriage moves there are attached blocks or stoppers against which at
every demi revolution of the crank, the hands strike and are lifted
so as to act upon the rag wheel in the requisite degree.
By means of the drawings deposited in the Patent Office and the ref
erences thereto annexed, the various parts which I have described &
their mode of action will be readily understood.
What I claim as my own invention and for which I ask a patent
is the causing the saws to act as the log traverses in either direction, the
mode of moving the log side ways as above described. the combined
use of the vertical and horizontal saws. cutting the sides and edges
of the laths simultaneously. the mode of adjusting the saws by
means of the sliding frame and the general construction and ar
rangement of the apparatus by which the intended effect is produ
ced

[illegible] Witnesses Francis Thurmand
W.C. Isaac Ripley
C. D. Williams

552½